United States Patent
Naldi

[11] Patent Number: 5,884,543
[45] Date of Patent: Mar. 23, 1999

[54] CUTTING MACHINE

[75] Inventor: Valter Naldi, Bologna, Italy

[73] Assignee: Selco S.r.l., Italy

[21] Appl. No.: 807,956

[22] Filed: Feb. 28, 1997

Related U.S. Application Data

[63] Continuation-in-part of Ser. No. 327,790, Oct. 20, 1994, abandoned.

[30] Foreign Application Priority Data

Oct. 22, 1993 [IT] Italy .................. B093A0417

[51] Int. Cl.[6] ..................................................... B26D 7/06
[52] U.S. Cl. ................... 83/98; 83/402; 414/676
[58] Field of Search ..................... 83/98, 99, 402, 83/477.2, 471.2; 406/88, 95; 414/676

[56] References Cited

U.S. PATENT DOCUMENTS

| | | | |
|---|---|---|---|
| 4,371,309 | 2/1983 | Principe et al. | 414/675 |
| 4,402,533 | 9/1983 | Cox et al. | 83/402 |
| 4,505,412 | 3/1985 | Reba | 83/402 |
| 4,527,346 | 7/1985 | Schwartzott | 83/402 |
| 4,644,833 | 2/1987 | Jenkner | 83/477.2 |
| 4,702,664 | 10/1987 | Lukens, Jr. | 83/451 |
| 4,747,329 | 5/1988 | Lukens, Jr. | 83/402 |
| 5,211,092 | 5/1993 | Blasi | 83/98 |
| 5,379,815 | 1/1995 | Brazell et al. | 83/477.2 |

*Primary Examiner*—Maurina T. Rachuba
*Attorney, Agent, or Firm*—Hall, Priddy & Myers

[57] ABSTRACT

A cutting machine which includes a work table made up of numerous hollow slats laid side to side and end to end, and having air holes for providing an air cushion as well as workpiece sensors in their upper surface, the sensors being associated with controls such that an air curtain is provided under the workpiece to be cut thereby keeping the workpiece from contacting the flat upper surface of the slats by air blown through the air holes located only in those slats, both longitudinally and laterally, above which the workpiece resides, and not providing air to those slats which do not sense any part of a workpiece residing above it.

3 Claims, 4 Drawing Sheets

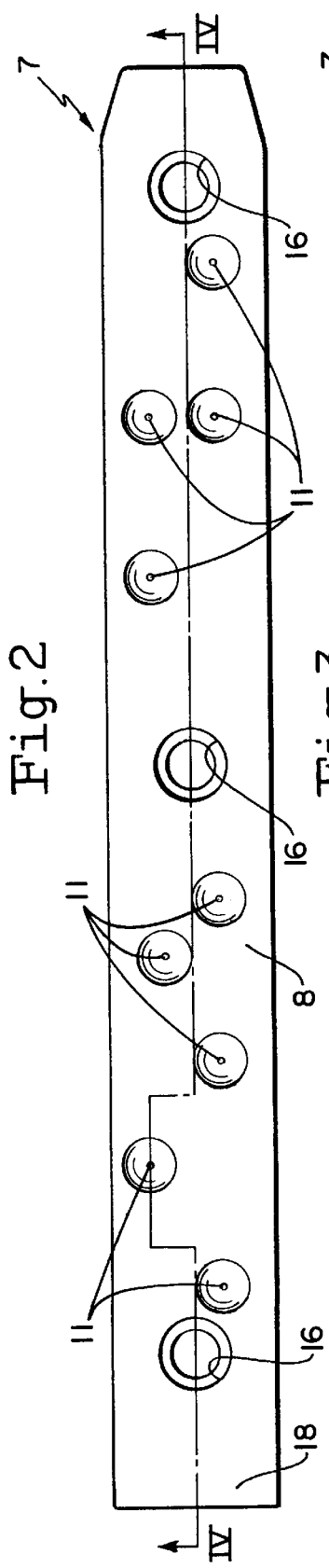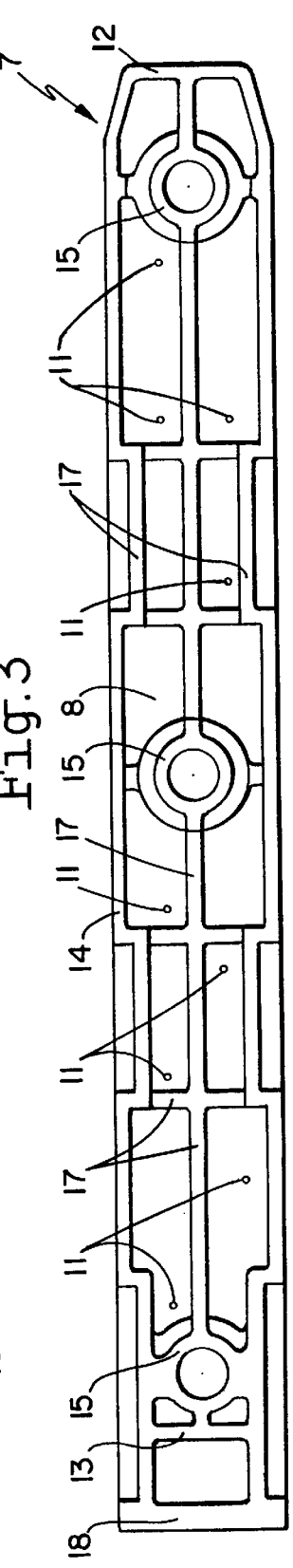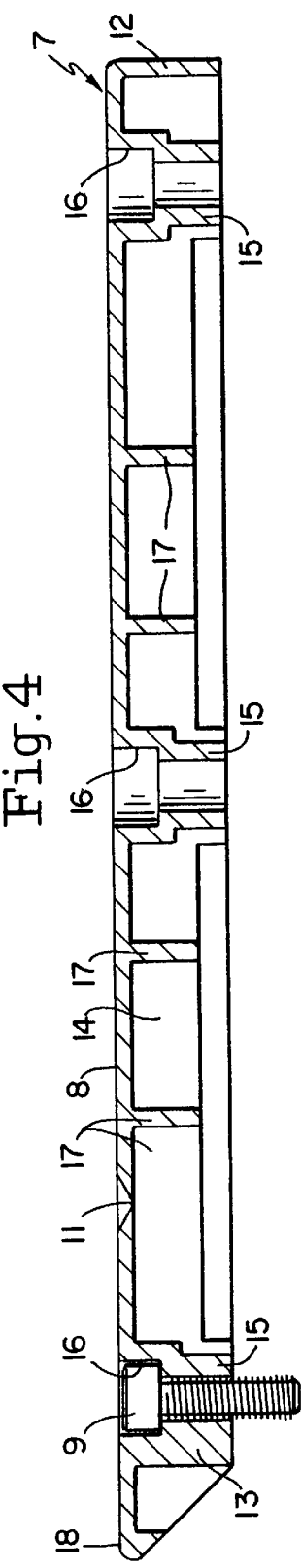

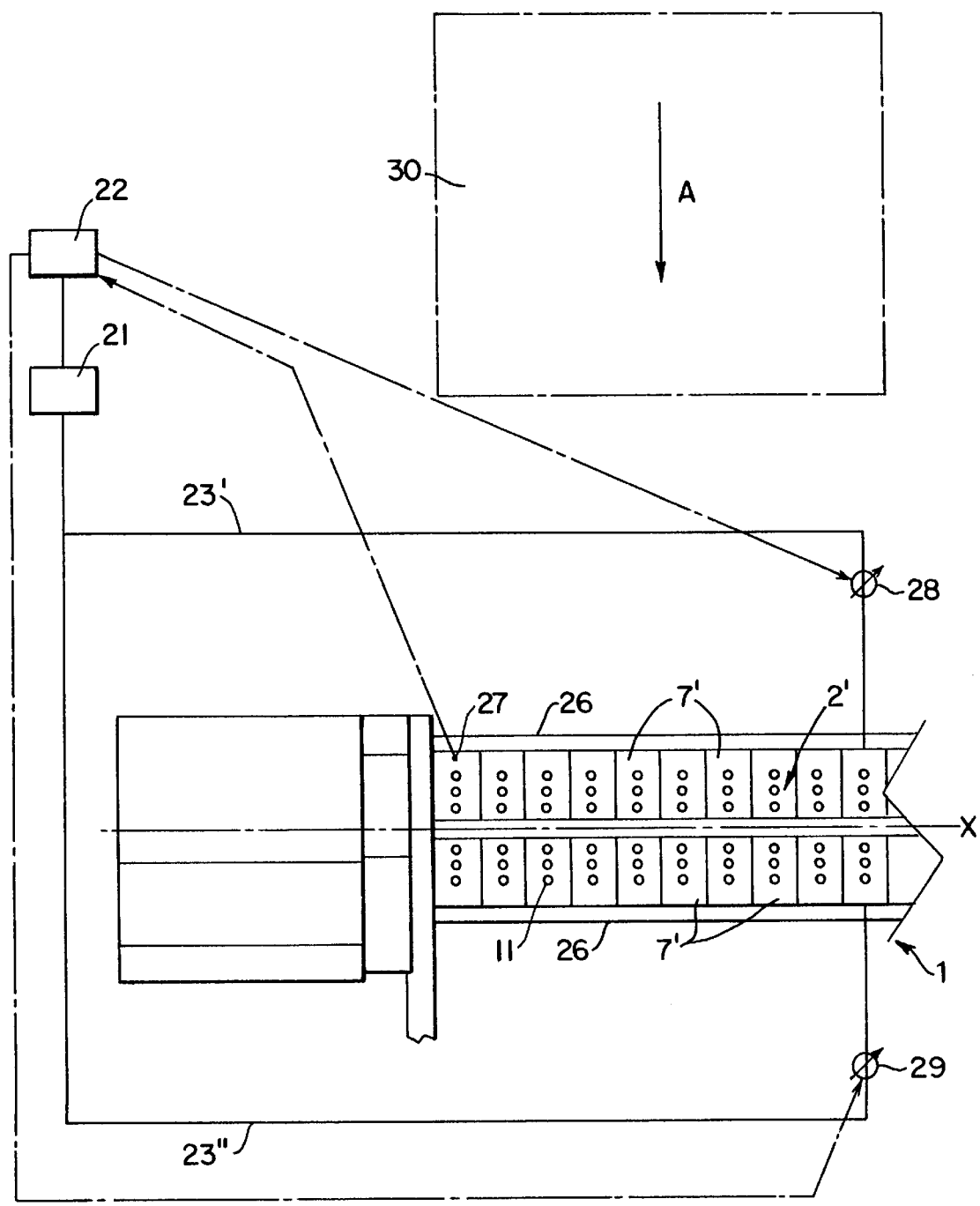

CUTTING MACHINE

This application is a continuation-in-part of U.S. Ser. No. 08/327,790, filed Oct. 20, 1994, now abandoned, the disclosure of which is incorporated herein by reference.

CUTTING MACHINE

The present invention relates to a cutting machine equipped with a newly designed transfer or work table.

As is known, cutting machines comprise one or more cutting stations, in turn presenting a work table, a cutting blade, and a cutting line defined in the work table and along which the blade operates; members for pushing the material to be cut (normally packs of wood panels) towards the cutting station; and members for removing the cut material from the cutting station. When loading and unloading at the cutting station, the material, by virtue of sliding over the work table which inevitably presents fragments made by the cutting blade, is subject to severe scoring, particularly in the case of panels with finished surfaces or of delicate material.

It is the main object of the present invention to provide a cutting machine featuring an air cushion for preventing the material from sliding over the work table and so preventing scoring of the material when loading and unloading it at the cutting station.

A further aim of the present invention is to provide a number of features for greatly improving industrial control of the air cushion.

In actual industrial use, in fact, it has been found preferable to only generate the air cushion when the pack of panels is actually on the transfer or work table, thus avoiding waste by generating compressed air to no purpose.

In one particular embodiment of the present invention, compressed air may be supplied to only one part of the transfer or work table, so as to only generate the air cushion where support of the pack of panels is actually required. This provides for avoiding waste, and for preventing the formation of currents, peripheral with respect to the pack of panels, which may impair correct formation of the air cushion beneath the pack of panels.

Further aims and advantages of the present invention will be disclosed in the following description.

According to the present invention, there is provided a cutting machine of the type comprising a cutting station having a transfer or work table, and wherein said transfer or work table comprises, on the upper surface, an air cushion for supporting a pack of panels; the transfer or work table is continuously flat, and comprises first detecting means for detecting the presence of the pack of panels and for supplying signals to second control means, and third means controlled by the second control means and for regulating compressed air supply to a number of holes for forming the air cushion on the transfer or work table.

A number of preferred non-limiting embodiments of the present invention will be described by way of example with reference to the accompanying drawings, in which:

FIGS. 2 and 3 show respective top and bottom plan views of a work table component of the FIG. 1 cutting station;

FIG. 4 shows a section along line IV—IV in FIG. 2.

FIG. 5 shows a plan view of a second embodiment of the cutting station in FIG. 1;

Figure 1:
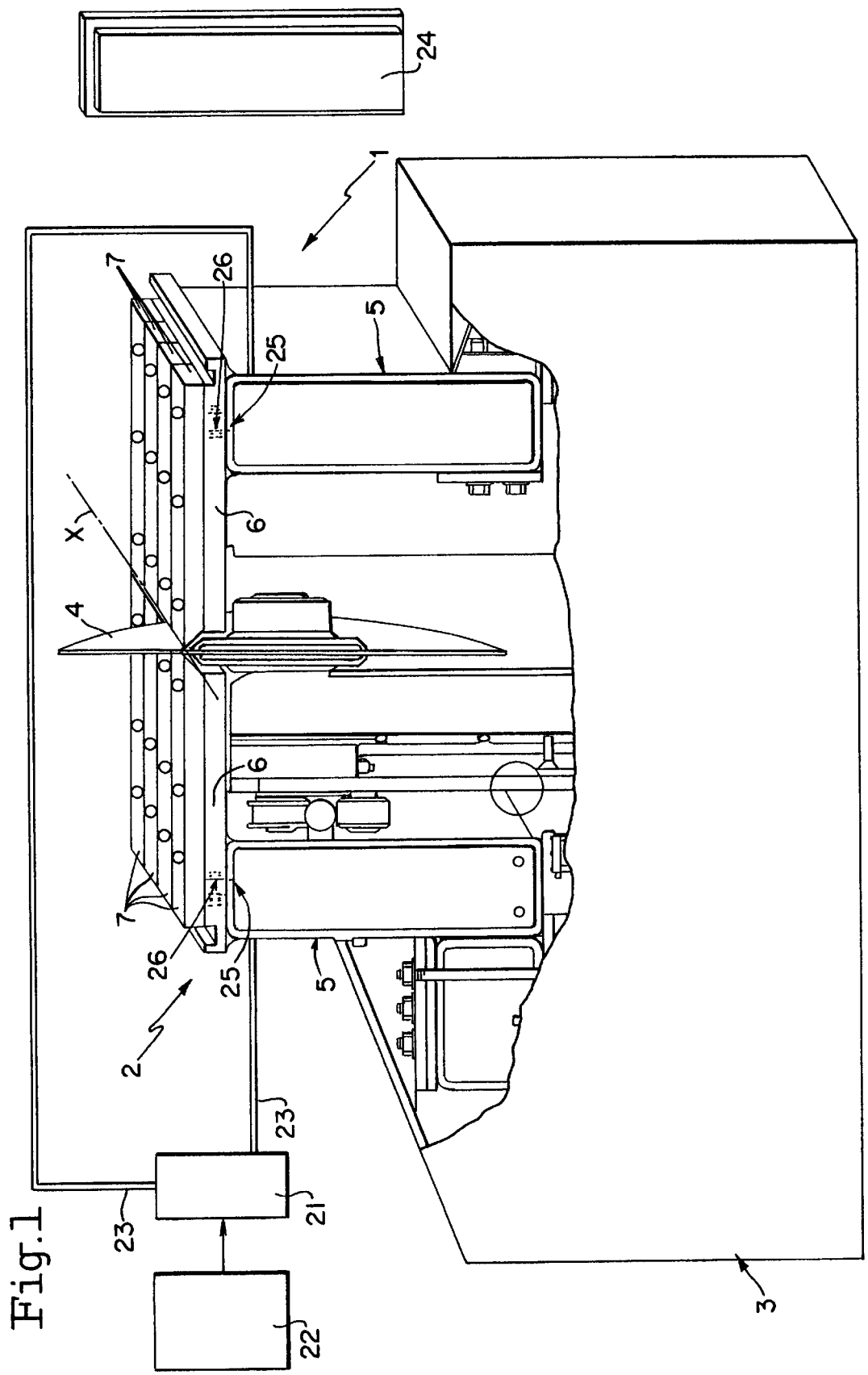
FIG. 1 shows a partially sectioned partial view in perspective of a cutting station of a cutting machine in accordance with the present invention.

The present invention relates to a cutting machine comprising a cutting station as shown and indicated as a whole by 1 in FIG. 1. Station 1 comprises a work table 2 in which is defined a cutting line X; a base 3 supporting work table 2; and a cutting blade 4 (shown in section) for cutting the work material (not shown) along line X. Base 3 is a known type housing means for guiding and moving blade 4 along cutting line X, and means for controlling rotation of blade 4; and the upper portion of base 3 comprises two hollow side members 5 parallel to each other and to cutting line X. Work table 2 comprises two coplanar plates 6 fixed, e.g. welded, to respective side members 5, and between which, at cutting line X, a gap is defined to permit operation of blade 4 along line X. For each plate 6, work table 2 also comprises a number of slats 7.

With reference to FIG. 1, slats 7 of each plate 6 are arranged side by side in orderly fashion to define the upper surface of work table 2, with the longitudinal axis of slats 7 perpendicular to cutting line X at which a gap is defined between the two groups of slats 7 to permit operation of blade 4 along line X. Each slat 7 is fixed to respective plate 6 by three screws 9, one of which is shown in FIG. 4.

With reference to FIGS. 2, 3 and 4, each slat 7 presents a substantially rectangular upper wall 8 in which are formed a number of through holes 11 flaring towards the upper face of wall 8. The upper faces of walls 8 form the supporting surface for the work material; and from the peripheral edges of each wall 8 there extend a rear wall 12, a front wall 13, and two lateral walls 14 parallel to the longitudinal axis of slat 7. Walls 12, 13 and 14 present the same height and in use press on plate 6, for airtight sealing the inside of slat 7 from the outside. Holes 11 are distributed along wall 8 from rear wall 12 to the vicinity of front wall 13, i.e. close to cutting line X; and from the lower face of wall 8 there extend three tubular sleeves 15 coaxial with respective through holes 16 formed in wall 8. Sleeves 15 are fitted through, in a manner not shown, with said screws 9, the threaded shanks of which are screwed into respective threaded holes (not shown) formed in plate 6, to secure slat 7 to plate 6 and form the airtight seal described above. The head of each screw 9 is recessed inside respective hole 16.

With reference to FIGS. 3 and 4, from the lower face of wall 8 of slat 7 there extend a number of longitudinal and transverse reinforcing ribs 17 which, as will be seen, are shorter in height than walls 12, 13 and 14, to permit compressed air supply to all of holes 11 in slat 7. From front wall 13 there extends a body 18 decreasing in thickness, and the upper face of which is flush with the upper face of wall 8.

With reference to FIG. 1, the cutting machine also comprises a pneumatic system 21 controlled by an electronic control unit 22, and which provides for generating and feeding compressed air along two pipes 23 into side members 5. In a manner not shown, side members 5 are closed at each end by airtight plates 24, one of which is shown detached in FIG. 1; and at each slat 7, the upper faces of side members 5 present a respective through hole 25 coaxial with a through hole 26 formed in plates 6.

In actual use, when loading and unloading the work material on and off work table 2, compressed air is blown into side members 5, through these and holes 25 and 26 into slats 7, and through holes 11 to the work material, so as to form an air cushion between the material and work table 2. When loading and unloading and also when cutting the material, the compressed air supply also provides for cleaning work table 2 of any fragments produced during the cutting operation.

The advantages of the present invention are as follows.

In particular, it provides for an air cushion between the whole of work table 2 and the material, for preventing the material from sliding over the work table, and so preventing scoring of the material when it is loaded and unloaded on and off the table. An important point to note is that compressed air supply holes 11 are provided almost up to cutting line X where the fragments are produced during cutting. Moreover, the compressed air also provides for continuously cleaning and so preventing fragments from accumulating on the work table. Finally, all the compressed air channels are formed easily using parts of the base and the work table.

Clearly, changes may be made to the machine as described and illustrated herein without, however, departing from the scope of the present invention.

In particular, as opposed to slats 7, work table 2 may present plates of a greater surface area than walls 8 and, of course, provided with holes 11 almost up to cutting line X; and, for feeding the compressed air to work table 2, side members 5 may be replaced by casings mounted along base 3 and each supplying compressed air inside slats 7.

It should also be pointed out that the slat solution adopted provides for a perfectly and continuously flat work table 2. If work table 2 were to be even only slightly deformed, it would contact the bottom surface of the pack of panels, thus preventing the air cushion from being formed as desired.

The Applicant has observed that, by virtue of slats 7 ensuring a perfectly and continuously flat work table 2, lower compressed air supply pressures may be used as compared with those normally used for forming air cushions. On the cutting machines produced by the Applicant, in fact, the output pressure from the holes in the work table range from 0.02 to 0.04 Atm.

For example, with a pack of panels of the following size:
length=1000 mm
width=600 mm
height=200 mm
and a specific weight of 0.8 Kg/dm$^3$ of the wood panels, the total weight of the pack of panels works out at about 100 Kg. With an output pressure of 0.026 Kg/cm$^2$ from the holes in work table 2, the bottom surface of the pack will be subjected to a thrust of 156 Kg, much greater than that required to support the pack without the bottom surface contacting work table 2.

And the same also applies to a transfer table (not shown in the drawings).

FIG. 5 shows a second embodiment of the cutting station of the cutting machine according to the present invention, and wherein work table 2 of cutting station 1 in FIG. 1 is replaced by a work table 2', which also comprises a number of slats 7' identical to slats 7 in FIG. 1, but differs from work table 2 (FIG. 1) by comprising at least one sensor 27 for supplying a signal to electronic control unit 22. Sensor 27, which may, for example, be optical or electromagnetic, provides for detecting the presence of a pack of panels (not shown) being pushed, by a pusher 30 in the direction of arrow A, onto cutting line X to be cut, and, as stated, supplies a signal to the electronic control unit, which opens two valves 28, 29 to supply compressed air along pipes 23', 23" and, hence, through hole 26, which, by supplying slats 7' in airtight manner in relation to one another, provides for supplying compressed air to a number of holes 11 for forming the air cushion.

Sensor 27 in FIG. 5 ensures that the air cushion for supporting the pack of panels entering cutting station 1 is only formed as the pack actually nears work table 2', thus saving valuable energy in the form of compressed air when the machine is not actually cutting.

As the pack of panels moves away from work table 2', sensor 27 obviously provides, via electronic control unit 22, for closing valves 28, 29.

Though the novel application of sensor 27 is described in connection with a work table 2' comprising a number of slats 7', the basic principles of the present invention may obviously also be applied to any work table involving the formation of an air cushion for supporting a pack of panels.

Figure 6:
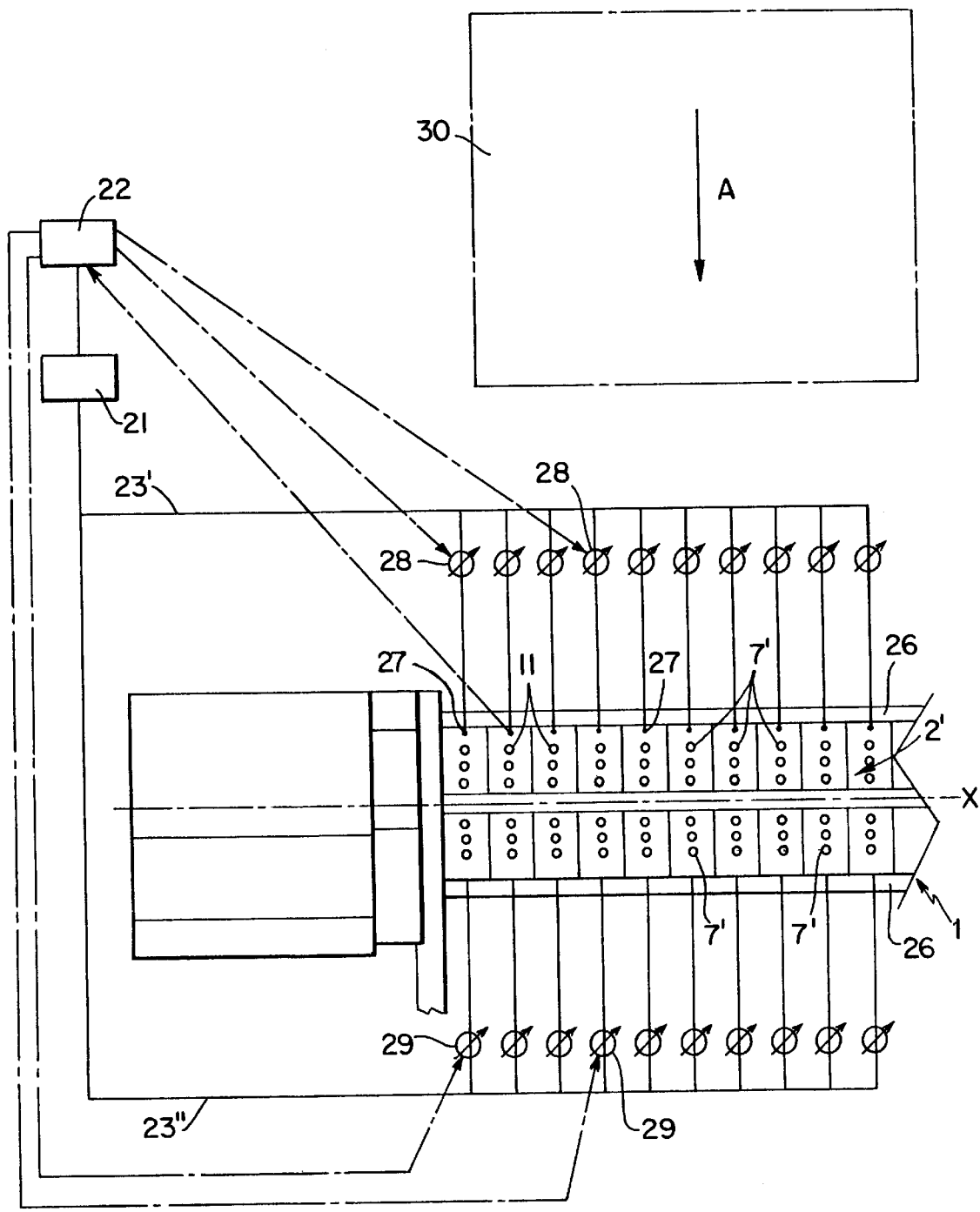
FIG. 6 shows a plan view of a third embodiment of the cutting station in FIG. 1.

FIG. 6 shows a third embodiment of cutting station 1 of the cutting machine according to the present invention.

As can be seen, the FIG. 6 embodiment, in which any elements identical to those in FIGS. 1 and 5 are shown using the same numbering system, differs from the FIG. 5 embodiment by comprising a greater number of sensors 27 and a greater number of valves 28, 29. Though, for the sake of simplicity, FIG. 6 shows only some of the connections between electronic control unit 22 and sensors 27 and valves 28, 29, all the elements regulating compressed air supply to slats 7' are obviously understood as being controlled by electronic control unit 22.

In actual use, each sensor 27 relative to each slat 7' may control compressed air supply to the respective slat 7', and possibly in the corresponding slat 7' on the opposite side of cutting line X, separately from the others, so that the air cushion is only formed at the part of work table 2' actually being used. When cutting packs of a smaller overall size than work table 2', the air cushion is therefore only formed at the part of work table 2' actually supporting the pack. Apart from the obvious saving in terms of the amount of compressed air produced, this also prevents the formation of turbulence about the edges of the portion covered by the pack, and which might impair correct formation of the air cushion beneath the supporting surface of the pack. Moreover, the compressed air issuing from the portions not actually involved in supporting the pack results in sawdust and scrap being swirled into the work environment. Sensors 27 and respective valves 28, 29 controlled by electronic control unit 22, on the other hand, provide for rationally controlling compressed air supply only to the slats 7' actually involved in forming the air cushion required to support the pack of panels, thus avoiding waste and the formation of undesired peripheral currents.

I claim:

1. In a cutting machine comprised of:

a cutting station including a work table having a substantially flat upper surface provided with a cutting line and a plurality of holes therein;

a base for supporting said work table;

cutting blade means comprised of a cutting blade provided at said cutting line for cutting a work material; and an air cushion mechanism including a source of air under pressure for providing air under pressure through said holes located in said substantially flat upper surface for preventing said work material to be cut when located on said upper surface from contacting said upper surface when said work material is moved there along during loading and unloading, wherein said upper surface is defined by a longitudinal length and a lateral width; the improvement which comprises:

said substantially flat upper surface including a plurality of slats having said holes therein and arranged side by side and end to end with respect to each other such that each said slat has a length and a width less than said length and width of said total upper surface;

said upper surface having located therein means for detecting the presence and absence of said work material along both the said longitudinal length and lateral width of said upper surface, and control means responsive to said detection means for actuating said air cushion so as to provide air under pressure only to the holes in those slats located in both said longitudinal length and lateral width of said upper surface upon which said work material resides.

2. The cutting machine according to claim 1 wherein said air cushion mechanism for providing air under pressure is capable of providing air through said holes at a pressure of from 0.02–0.04 Atm.

3. The cutting machine according to claim 1 wherein said work table includes a pair of co-planar opposing base plates spaced one from the other thereby to define a gap located at said cutting line in which said cutting blade resides; wherein said slats each include an upper substantially flat wall having therein a plurality of said holes; wherein said flat wall has contiguously connected thereto at their upper surfaces, a rear wall, a front wall and opposing sidewalls whose lower surfaces are contiguously connected to said base plate so as to form an air chamber in said slats; and wherein said base plate upon which said slats reside includes at least one base plate airhole in communication with each said air chamber in said slats and with said source of air under pressure.

* * * * *